March 27, 1951  V. A. RAYBURN  2,546,318
CONVEYER FOR HANDLING TACKY MATERIAL
Filed Oct. 29, 1946  2 Sheets-Sheet 1

INVENTOR
V. A. RAYBURN
BY
C. B. Hamilton
ATTORNEY

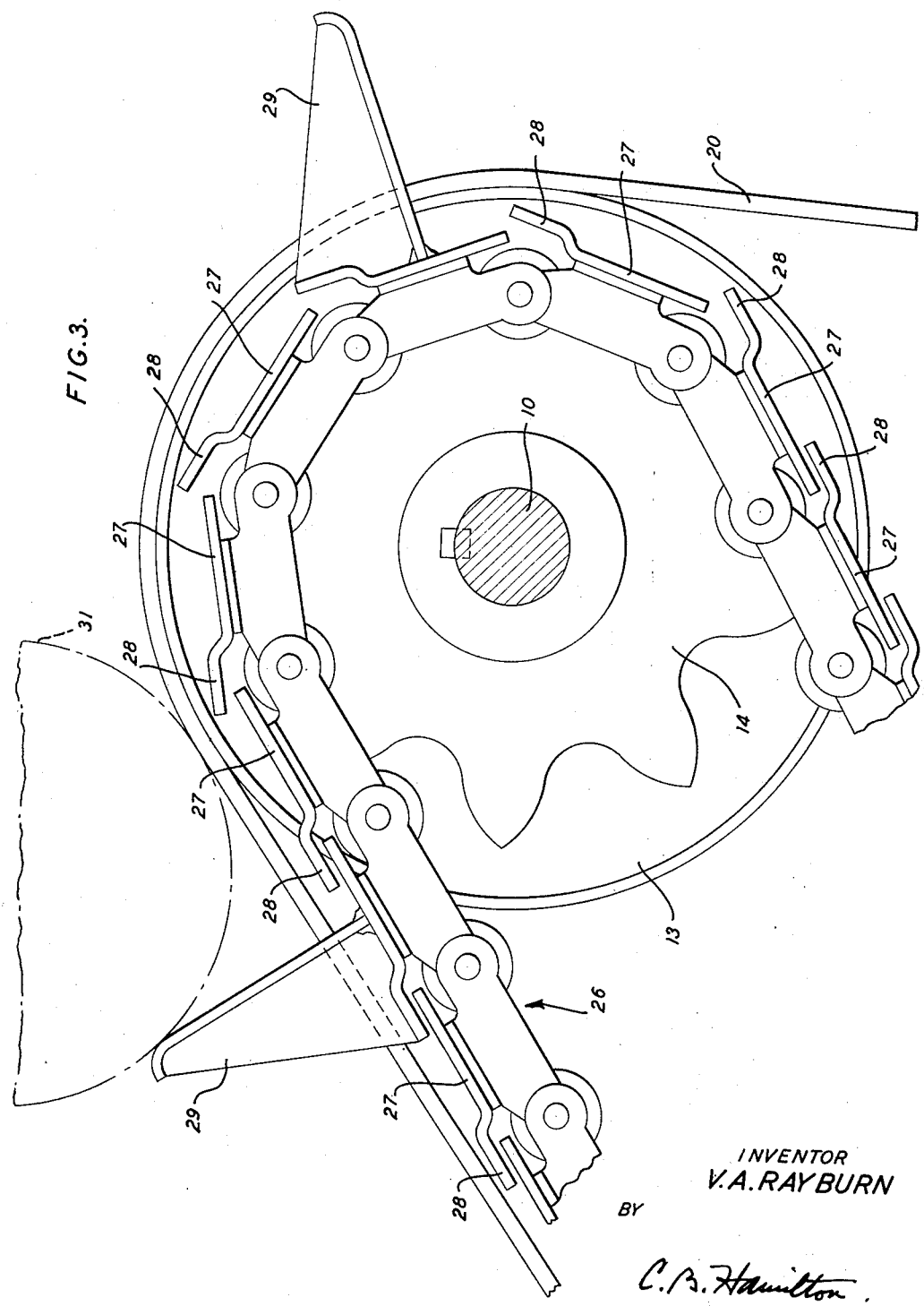

Patented Mar. 27, 1951

2,546,318

UNITED STATES PATENT OFFICE 2,546,318

CONVEYER FOR HANDLING TACKY MATERIAL

Vincent A. Rayburn, Baltimore, Md., assignor to Western Electric Company, Incorporated, New York, N. Y., a corporation of New York Application October 29, 1946, Serial No. 706,444

13 Claims. (Cl. 198—190)

This invention relates to conveyors and more particularly to a conveyor for handling rolls of tacky material such as uncured rubber or plastics.

In the manufacture of insulating compounds it is often necessary or desirable to sheet off hot uncured rubber or like compounds in rolls. The problem of handling rubber or plastics in this form is complicated by the tackiness of the material which causes it to stick to surfaces, by its high friction coefficient which causes it to seize to stationary surfaces and resist being pushed or dragged, and by the flow characteristic of the hot compound which causes it to quickly conform to surfaces on which it is laid.

An object of this invention is the provision of a practical, efficient and reliable conveyor for handling tacky material.

With this and other objects in view, the present invention comprises a plurality of fabric belts alternating with a plurality of chains carrying overlapping pallets and having raised cleats or lugs spaced uniformly along the chains to keep the rolls of tacky material in place on steep inclines. The fabric belts are carried over drive pulleys larger in diameter than the adjacent drive sprockets for the chains so that the belts have a higher surface speed than the adjacent chains and the belts diverge or rise above the surface of the chains at a predetermined point with the result that the rolls of tacky material are easily freed from the conveyor by the combined lifting action of the rising belts and the pulling away action of the faster moving belts. As a further method of stripping the rolls of tacky material from the conveyor, the overlapping pallets on the chains are arranged to overlap rearwardly so that each forward pallet acts to pry the tacky material loose from the next succeeding pallet as the chains wrap around the sprocket.

Other advantages and objects of the invention will be apparent form the following detailed description when taken in conjunction with the accompanying drawings, wherein:

Fig. 3 is an enlarged fragmentary sectional view of the head or delivery end of the conveyor taken along line 3—3 of Fig. 2.

Figure 2:
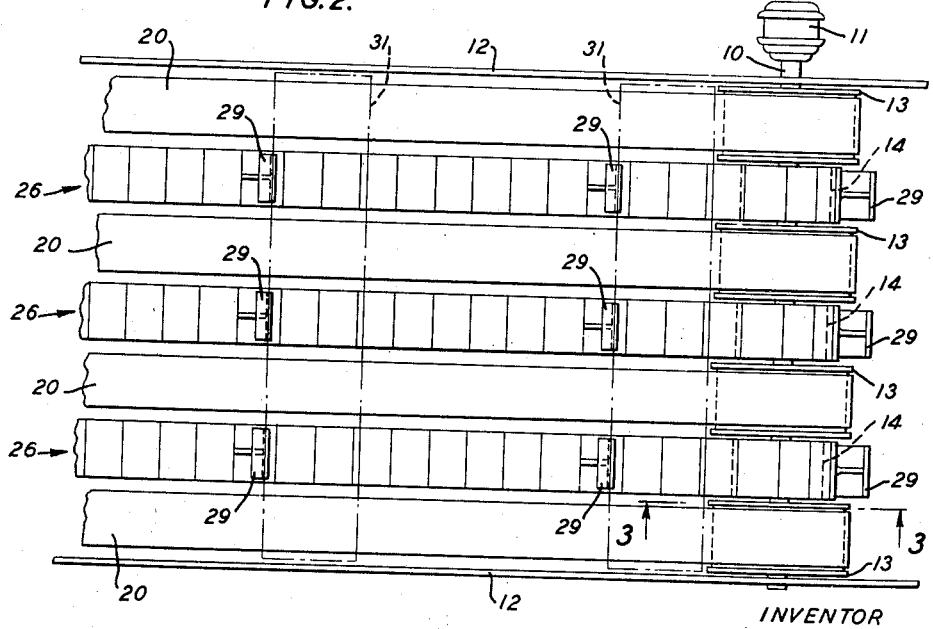
Fig. 2 is a fragmentary or partial top plan view of the conveyor of this invention taken along line 2—2 of Fig. 1.

Referring now to the drawings, wherein the same reference numerals indicate identical parts throughout the several views, a head shaft 10 driven by a motor 11 is suitably supported for rotation in a frame 12 (Fig. 2). Splined to the shaft 10 in spaced and alternate arrangement are a plurality of belt pulleys 13 and a plurality of chain sprockets 14; the belt pulleys being of a larger diameter than the chain sprockets.

Spaced from the driven head shaft 10 in parallel relationship thereto is a tail or idler shaft 15 which is suitably mounted on the frame 12. A plurality of idler belt pulleys 16 and a plurality of idler chain sprockets 17 are rotatably supported on the tail shaft 15 in alternate arrangement so as to be in alignment with their corresponding paired pulleys 13 and sprockets 14 on the head shaft 10. The belt pulleys 16 on the tail shaft are smaller in diameter than the sprocket 17 thereon.

Passing over each pair of pulleys 13, 16 is an endless belt 20, made of fabric or any other suitable material and treated with wax or plastic to provide an anti-stick surface. Each endless belt 20 passes over an idler sheave 21 and a slack take-up pulley 22 which is rotatably mounted on a movable arm 23 pivoted to a member 24 secured to the frame 12. Each arm 23 carries a weight 25 which keeps each of the belts 20 under a constant tension at all times.

A sprocket chain 26 is provided for each aligned pair of the sprockets 14, 17 and has secured to it a series of overlapping pallets 27. As shown in Fig. 3 each of these pallets has a rearwardly extending off set portion 28 which overlaps the front end of the next succeeding pallet 27. Secured to predetermined pallets 27 on the sprocket chains at spaced uniform distances therealong are a plurality of raised cleats or lugs 29. These endless chains 26 pass over sprockets 14, 17 and are driven by sprockets 14.

Associated with the off-end delivery conveyor just described is a standard type of belt conveyor 30 positioned a right angles thereto for receiving and transporting a roll of material to a desired location, or a storage table could be provided at the off end delivery of the conveyor.

Figure 1:
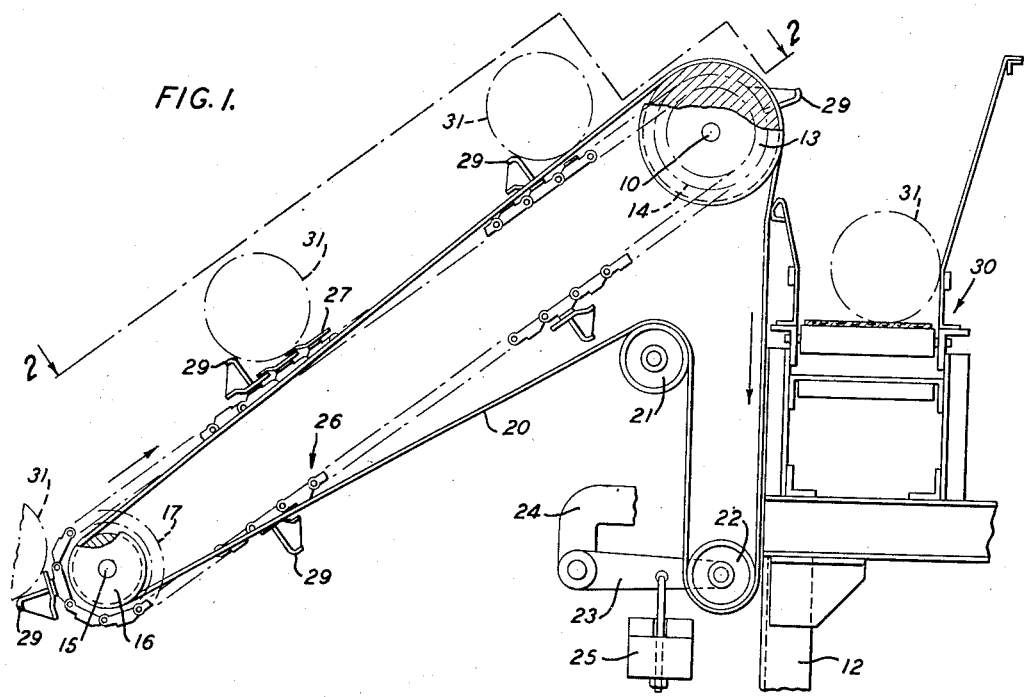
Fig. 1 is a front elevational view of a conveyor, constituting one embodiment of the invention, adapted to give off-end delivery of material to another conveyor or receiving device.

In the operation, the motor 11 is started to drive the head shaft 10 and the plurality of belt pulleys 13 and sprockets 14 secured thereto. The pulleys 13 and sprockets 14 thereupon operate the endless belts 20 and chains 26, respectively. A tacky sheet material 31 in roll form, such as hot uncured rubber, is then placed onto the conveyor at its tail or receiving end (left side of Fig. 1) whereupon a row of the upstanding lugs or cleats 29, arranged in a straight line crosswise of the conveyor as shown in Figs. 1 and 2, contact the roll 31 of tacky material to carry it up the incline to the head or delivery end of the conveyor where the roll is dumped onto another conveyor 30 or any other type of receiving means.

It is to be noted that when the rolls 31 of tacky material are received at the tail or receiving end of the conveyor, the overlapping pallets 27 and cleats 29 of the chains 26 are mainly supporting the rolls 31 because the alternate belts 20 are at a lower level than the chains 26 due to the fact that the diameters of the belt pulleys 16 are smaller than the diameter of the chain sprockets 17.

As the roll of tacky material is carried upward on the conveyor the moving belts 20 continue to gradually rise relative to the moving chains 26 until the upper surface of the belts rise above the surface of the pallets 27—28 to lift the roll 31 at the delivery end of the conveyor. The rise of the belts 20 is caused by the fact that the head pulleys 13 are larger in diameter than the head sprockets 14. This difference in diameters between the driving pulleys 13 and the driving sprockets 14 also causes the belts 20 to travel at a higher speed than the chains 26.

The higher speed of the belts 20 combined with the rise of the belts above the upper surface of the pallets 27—28 and the chains 26 frees the tacky roll 31 from the pallets 27—28 and the raised cleats 29 of the chains 26 at the delivery end of the conveyor by the combined lifting action of the rising belts 20 and the pulling away action of these faster running belts. As the chains 26 pass around their sprockets 14 at the delivery end of the conveyor, the overlapping rear portions 28 of the pallets 27 act as prying levers to force the tacky material loose from succeeding pallets as shown in Fig. 3.

Also it is to be noted that the belts 20 and the chains 26 are made to travel in substantially separate paths as they reach the head shaft 10 so that the roll of tacky material 31 is forced to relinquish whatever remaining hold it may have on the surfaces of the pallets 27—28 of the chains 26.

The diverging paths of travel of the belts 20 and the chains 26 and the delivery or head end of the conveyor are such that the angle formed between the raised cleats 29 and the surfaces of the belts 20 diverges or opens up to permit the roll 31 to drop on the conveyor into the receiving means 30 and thus prevents the forming of any converging angle therebetween that might grip or hook the roll of material 31.

While but one embodiment of the invention has been described and illustrated, it will be evident that many changes and modifications may be made therein without departing from the spirit and scope of the invention as defined by the appended claims.

What is claimed is:

1. A conveyor for tacky articles comprising a supporting frame, a plurality of pairs of pulleys and pairs of sprockets alternately mounted in the frame, a plurality of conveying belts supported on said pulleys, a plurality of conveying chains supported on said sprockets, means for driving predetermined pulleys, and sprockets to move the chains and belts simultaneously to provide a composite belt and chain conveying surface for material to be transported, and a series of rigid overlapping pallets secured to the chains, each of said pallets having a sufficient overlap to pry the tacky articles from a succeeding pallet during movement of the chains and pallets around the sprockets.

2. A conveyor for tacky material comprising a supporting frame, a driving shaft rotatably mounted in the frame, an idler shaft mounted in the frame, a plurality of spaced pulleys secured to the driving shaft, a plurality of spaced sprockets alternately arranged with the pulleys and secured to the driving shaft, said pulleys being of a larger diameter than the said sprockets, a plurality of conveying belts having waxed surfaces and supported on the pulleys, a plurality of conveying chains supported on the sprockets, and means for rotatably supporting the belts and chains on the idler shaft to provide a diverging composite belt and chain conveying surface whereby the tacky material is carried by both the chains and belts for a predetermined distance and then the waxed belts gradually lift the tacky material off the chains.

3. In a conveyor for handling tacky material, a tail sprocket, a head sprocket spaced therefrom, a chain conveying means supported on the sprockets comprising a series of rigid pallets arranged to overlap rearwardly, raised cleats secured to predetermined pallets at spaced distances along the chain, and means for rotating one of the sprockets whereby the chain conveying means is driven and each pallet preceding each cleat on passing around the head sprocket acts to pry the tacky material away from the cleat due to the said overlap.

4. In a conveyor for handling tacky material, a frame, a tail shaft supported in the frame, a pulley mounted on the tail shaft, a sprocket of larger diameter than the pulley and mounted on the tail shaft, a head shaft spaced from the tail shaft and supported in the frame, a head pulley mounted on the head shaft, a head sprocket smaller in diameter than the head pulley and mounted on the head shaft, an endless chain supported on the sprockets, a series of overlapping pallets secured to the chain, raised cleats secured to predetermined pallets at spaced distances along the chain, an endless belt supported on the pulleys, and means for rotating the head shaft to move the belt and chain.

5. In a conveyor having a receiving station and a delivery station, a first endless conveying means extending therebetween, means for actuating the conveying means at a predetermined speed, a second endless conveying means cooperating with the first conveying means to form a composite conveying surface including the surfaces of both the first and second conveying means for transporting articles from the receiving station to the delivery station, and means for raising the second conveying means above the level of the first conveying means at the delivery station and for actuating the second conveying means at a speed different from that of the first conveying means to cause relative movement in the composite conveying surface.

6. In a conveyor having a receiving station and a delivery station, a first endless conveying means, a second endless conveying means cooperating with the first conveying means to form a composite conveying surface including the surfaces of both the first and second conveying means for transporting articles from the receiving station to the delivery station, means for supporting both conveying means at the receiving station so that the second conveying means is at a level below that of the first conveying means, and means for supporting both conveying means at the delivery station so that the second conveying means is at a level above that of the first conveying means.

7. In a conveyor having a receiving station and a delivery station, a first conveying means, a second conveying means for cooperating with the first conveying means to form a composite conveying surface including the surfaces of both the first and second conveying means for transporting articles from the receiving station to the delivery station, means for supporting both conveying means at the receiving station so that the second conveying means is at a level below that of the first conveying means, means for supporting both conveying means at the delivery station so that the second conveying means is at a level above that of the first conveying means, and motor means for actuating the said conveying means at different speeds to cause relative movement between the said conveying means and in the composite conveying surface.

8. In an inclined elevating conveyor for handling rolls of tacky material, a receiving station, a delivery station, a composite conveying surface extending from the receiving station to the delivery station, said composite conveying surface comprising a plurality of spaced chains and fabric belts having waxed conveying surfaces extending between said stations, means secured at uniform distances to the chains for supporting rolls of tacky material in straight lines cross-wise of the conveyor as they are elevated, means for supporting the chains and belts at the receiving station so that the chains are at a higher level than the belts, and means for actuating the chains and belts at different speeds and for supporting them at the delivery station so that the belts are positioned at a level higher than that of the chains to cause relative movement between the said conveyors and in the composite conveying surface.

9. In a conveyor for transporting tacky articles from a receiving station to a delivery station, a composite conveying surface comprising a plurality of cooperating endless conveying surfaces arranged to travel from the receiving station to the delivery station in intersecting planes and at different speeds whereby the tacky articles are transferred from one of the cooperating conveying surfaces at the receiving station to the other cooperating conveying surfaces at the delivery station, and a series of rigid overlapping pallets on one of said conveying surfaces, each of said pallets having a sufficient overlap to pry the tacky articles from a succeeding pallet during circular movement of said endless conveyor around the delivery station.

10. In a conveyor for transporting tacky articles from a receiving station to a delivery station, a plurality of endless conveying belts, a plurality of endless conveying chains alternately spaced from the conveying belts, the belts and chains being arranged to travel from the receiving station to the delivery station in intersecting planes whereby the tacky articles are supported by the conveying chains at the receiving station and are supported by the conveying belts at the delivery station, means to drive the belts at a speed different from the speed of the chains, and a series of overlapping rigid pallets secured to the chains, each of said pallets having a sufficient overlap to pry the tacky articles from a succeeding pallet during arcuate movement of said endless chain around the delivery station.

11. In an incline conveyor, a receiving station, a delivery station, a composite supporting surface extending from the receiving station up to a delivery station, said composite supporting surface comprising a plurality of spaced chains and conveying belts arranged alternately, means secured at spaced distances on the chains for supporting the material crosswise of the conveyor in straight lines, and means for actuating the belts at a speed greater than that of the chains to cause relative movement therebetween and in the composite supporting surface.

12. In an incline conveyor for rolls of tacky material having a receiving station and a delivery station, a first endless conveying means, a second endless conveying means cooperating with the first conveying means to form a composite conveying surface for simultaneously transporting the rolls, means secured at uniform distances to the second conveying means for supporting the rolls in straight lines crosswise of the conveyor as they are elevated, said supporting means forming an acute angle with the surface of the first conveying means as the composite conveying surface moves from the receiving station to the delivery station and forming an obtuse angle with the first conveying means as the composite surface moves through the delivery station, and means for actuating the first and second conveying means at different speeds to cause relative movement between the said conveyors in the composite conveying surface.

13. In a conveyor, a conveying chain moving in a first plane for transporting an article, a conveying belt moving in a second plane and associated with said chain to form a composite conveying surface including moving surfaces in the first and second planes for transporting the same article, means for actuating the chain at a predetermined speed, and means for actuating the belt at a speed different from that of the chain to cause relative movement therebetween and in the composite conveying surface.

VINCENT A. RAYBURN.

REFERENCES CITED

The following references are of record in the file of this patent:

UNITED STATES PATENTS

| Number | Name | Date |
| --- | --- | --- |
| 248,713 | Converse | Oct. 25, 1881 |
| 892,740 | Koob | July 7, 1908 |
| 937,906 | Whitaker | Oct. 26, 1909 |
| 1,332,866 | Emerson | Mar. 2, 1920 |
| 2,073,082 | Walter | Mar. 9, 1937 |